United States Patent [19]

Copa et al.

[11] Patent Number: 4,897,196
[45] Date of Patent: * Jan. 30, 1990

[54] TWO-STAGE BATCH WASTEWATER TREATMENT

[75] Inventors: William M. Copa, Wausau; Thomas J. Vollstedt, Schofield, both of Wis.

[73] Assignee: Zimpro/Passavant Inc., Rothschild, Wis.

[*] Notice: The portion of the term of this patent subsequent to Mar. 7, 2006 has been disclaimed.

[21] Appl. No.: 157,456

[22] Filed: Feb. 17, 1988

[51] Int. Cl.$^4$ .............................................. C02F 3/12
[52] U.S. Cl. .................................... 210/616; 210/626; 210/628; 210/631; 210/744
[58] Field of Search ............... 210/610, 616, 618, 623, 210/624, 626, 628, 629, 631, 694, 732-736, 744

[56] References Cited

U.S. PATENT DOCUMENTS

| | | | |
|---|---|---|---|
| 3,524,547 | 8/1970 | Nicol | 210/134 |
| 3,803,029 | 4/1974 | Blecharczyk | 210/618 |
| 3,904,518 | 9/1975 | Hutton et al. | 210/616 |
| 3,957,632 | 5/1976 | Knopp et al. | 210/616 |
| 3,980,556 | 9/1976 | Besik | 210/616 |
| 4,069,148 | 1/1978 | Hutton et al. | 210/616 |
| 4,076,615 | 2/1978 | Olesen et al. | 210/616 |
| 4,167,479 | 9/1979 | Besik | 210/626 X |
| 4,172,781 | 10/1979 | Walk et al. | 210/626 |
| 4,292,176 | 9/1981 | Gratsch et al. | 210/624 X |
| 4,468,327 | 8/1984 | Brown et al. | 210/626 |
| 4,479,876 | 10/1984 | Fuchs | 210/616 X |
| 4,500,429 | 2/1985 | Reimann et al. | 210/616 |
| 4,623,464 | 11/1986 | Ying et al. | 210/616 |
| 4,663,044 | 5/1987 | Goronszy | 210/610 |

OTHER PUBLICATIONS

"Biophysical Treatment of Landfill Leachate Containing Organic Compounds", *Proceedings of Industrial Waste Conference*, 1986 (pub. 1987), 41st, 167-177. (Sheila F. McShane, James M. Montgomery, Consulting Engineers, Inc.; Alon Lebel, BKK Corp., T. E. Pollock, James M. Montgomery, Consulting Engineers, Inc., Bryan A. Stirrat, Bryan A. Stirrat and Associates, Consulting Civil Engineers.
*Journal Water Pollution Control Federation*, vol. 51, No. 2, Feb. 1979, pp. 274-287. (Mervyn C. Goronszy).

*Primary Examiner*—Tom Wyse
*Attorney, Agent, or Firm*—Michael, Best & Friedrich

[57] ABSTRACT

A two-stage, batch process for purifying wastewater containing organic and adsorbable pollutants includes the steps of introducing a predetermined quantity of the wastewater into an aeration and settling zone of a primary treatment zone and aerating therein in the presence of a powered absorbent, such as activated carbon, and biologically active solids, terminating aeration and retaining the thus-treated wastewater in the aeration and settling zone a sufficient time for a substantial portion of the suspended solids to settle by gravity. A predetermined amount of the partialy-treated wastewater is withdrawn from the aeration and settling zone and introduced into a contact zone wherein it is agitated, preferably by aeration, in the presence of a powered adsorbent, agitation is terminated and the solids are allowed to settle by gravity. After completion of settling, clarified, substantially solids-free water is withdrawn from the contact zone.

15 Claims, 2 Drawing Sheets

TWO-STAGE BATCH WASTEWATER TREATMENT

BACKGROUND OF THE INVENTION

1. Field of the Invention

This invention relates to two-stage batch processes for purifying wastewater containing organic and adsorbable pollutants and more particularly, to such processes including a biophysical treatment first stage and an adsorbent contact treatment second stage.

2. Related Prior Art

The problem of water pollution is widely recognized and has resulted in local, state and federal regulations. In response to these regulations, as well as in the public interest, various treatment methods have been developed to remove the pollutants found in wastewater.

The quantity of pollutants in wastewater is commonly determined by measuring the amount of dissolved oxygen required to biologically decompose the waste organic matter in polluted water. This measurement, called biochemical oxygen demand (BOD), provides an index of the organic pollution of water. Some organic contaminants, such as chlorinated aromatics, are not amenable to conventional biological decomposition and tests such as chemical oxygen demand (COD) and total organic carbon (TOC) have been employed to measure the concentration of these compounds.

A particularly useful process for removing pollutants from wastewater employs a mixture of bacteria and powdered activated carbon in a treatment zone. This process, called the PACT ™ treatment system, is disclosed in U.S. Pat. Nos. 3,904,518 and 4,069,148, to Hutton et al. The PACT ™ treatment system operates as a continuous flow process with an aeration basin followed by a separate clarifier to separate biologically active solids and carbon from the treated wastewater and the settled sludge is returned to the aeration basin.

A slightly different biophysical treatment process is described by McShane et al., in "Biophysical Treatment of Landfill Leachate Containing Organic Compounds", *Proceedings of Industrial Waste Conference*, 1986 (Pub. 1987), 41st, 167–77. In this process a biological batch reactor is used with powdered activated carbon and the system is operated in the "fill and draw" mode, also known as the sequenced batch reactor (SBR) mode. A similar scheme for treatment of leachate is disclosed in U.S. Pat. No. 4,623,464 to Ying et al. in which an SBR is operated with both biologically active solids and carbon present to treat a PCB and dioxin-containing leachate.

Another single-vessel method of biological wastewater treatment is the Intermittent Cycle Extended Aeration System (ICEAS) described by Goronszy in *Journal Water Pollution Control Federation*, Vol. 51, No. 2, Feb. 1979, PP 274–287.

U.S. Pat. No. 4,468,327 to Brown et al. discloses a single vessel biological treatment process, known as extended aeration, in which a single vessel fitted with at least one inlet baffle continuously receives influent and intermittently aerates, settles and decants biologically treated effluent.

U.S. Pat. No. 3,524,547 to Nicol discloses a sewage treatment plant which includes an inlet compartment and two treatment compartments. Sewage from the inlet compartment is transferred substantially continuously from the inlet compartment into a first treatment compartment, from the first treatment compartment to a second treatment compartment and treated sewage is removed from the second treatment compartment. The flow is then reversed, flow being from the inlet compartment to the second treatment compartment, to the first compartment and finally from the system. Thus, the two treatment compartments alternately serve as the first and second treatment stages.

U.S. Pat. No. 4,663,044 to Goronszy discloses a continuous inflow, activated sludge tratment process employing three zones for biological adsorption and biological degradation. Activated sludge contacts wastewater in a separate first zone to adsorb biodegradable dissolved compounds. The sludge wastewater mixture passes to interconnected second and third zones where aeration and settling are followed by decanting of biologically treated effluent.

These different straight biological treatment methods often do not produce a treated wastewater of suitable quality for discharge to the environment. Likewise, the use of a mixture of biologically active solids and powdered activated carbon in the same system may be incapable of producing adequate treatment to meet discharge requirements for wastewaters containing compounds which are difficult to biodegrade and only weakly adsorbed on carbon.

Application Ser. No. 140,651, filed Jan. 4, 1988 and assigned to the present assignee, discloses a two stage wastewater treatment process in which the first stage employs a continuous biophysical treatment and the second stage employs a batch adsorbent contact treatment.

SUMMARY OF THE INVENTION

An object of the invention is to provide a two-stage batch process for purifying wastewater containing organic and adsorbable pollutants which employs aeration of the wastewater in the presence of a powdered adsorbent and biologically active solids in the first stage and additional treatment with a powdered adsorbent in a second stage without the need for clarifying equipment to separate the adsorbent from the effluent.

Another object of the invention is to provide such a process which is capable of producing improved removal of pollutants.

A further object of the invention is to provide such a process wherein settling times in the second stage can be varied to maximize separation of solids.

Other aspects, advantages and objects of the invention will become apparent to those skilled in the art upon reviewing the following detailed description, the drawings and the appended claims.

The invention provides a two stage, batch, wastewater treatment process in which the wastewater is first treated in a primary treatment zone including an aeration and settling zone wherein the wastewater is aerated with an oxygen-containing gas in the presence of a powdered adsorbent, preferably activated carbon, and biologically active solids to remove a major portion of the pollutants and then treated in a contact zone wherein it is agitated with a powdered adsorbent to further remove pollutants. After a predetermined quantity of the wastewater has been introduced into the primary treatment zone, aeration and agitation are terminated and the thus-treated wastewater is retained in the aeration and settling zone a sufficient time for a substantial portion of the mixed liquor solids therein to settle by gravity to produce a first clarified aqueous phase and a first solids phase. A flocculant aid for promoting settling of solids preferably is added to the aeration and settling zone shortly before termination of aeration.

A predetermined amount of the first aqueous phase is withdrawn from the aeration and settling zone and transferred to the contact zone wherein it is agitated, preferably by aeration with a pressurized oxygen containing gas, in the presence of a powdered adsorbent for an agitation period sufficient to reduce the pollutants to a desired level. After termination of the agitation period, the solids in the thus-treated first aqueous phase are allowed to settle by gravity for a settling period sufficient to produce a substantially solids-free, second clarified aqueous phase and a second solids phase. A predetermined amount of the second aqueous phase is thereafter withdrawn from the contact zone and these fill, agitate, settle and draw steps are then repeated in the contact zone.

A flocculant aid for promoting settling of solids preferably can be added to the contact zone near the end of the agitation period. All or a portion of the second solids phase can be recycled to the primary treatment zone and a portion of the mixed liquor solids can be withdrawn from the primary treatment zone to maintain the amounts of adsorbent and biologically active solids present in the primary treatment zone at predetermined levels.

In one embodiment, the primary treatment zone includes an inlet zone which is substantially isolated from and in continuous fluid communication with the aeration and settling zone. The wastewater influent continuously flows into the inlet zone at a first flow rate and passes therefrom into the aeration and settling zone. After completion of the first settling step, the first clarified aqueous phase is withdrawn from the aeration and settling zone at a second flow rate greater than the first flow rate until a predetermined amount of the first aqueous phase has been withdrawn. The fill and agitate, settle and draw steps can then be repeated.

DESCRIPTION OF THE PREFERRED EMBODIMENTS

Figure 1:
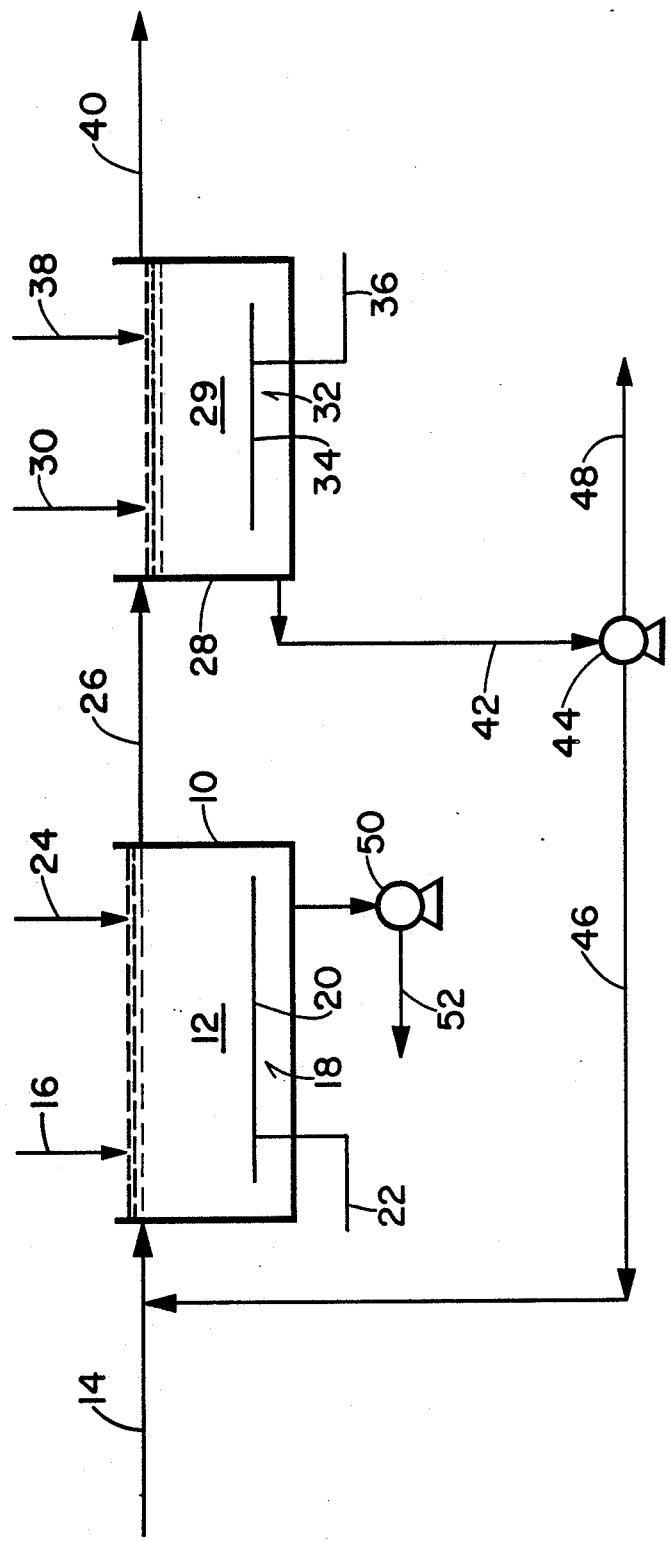
FIG. 1 is a schematic flow diagram of one embodiment of the invention in which wastewater is intermittently introduced into the primary treatment zone.

Referring to FIG. 1, a wastewater containing organic and adsorbable pollutants is introduced into a primary treatment zone or tank 10 including an aeration and settling zone 12.

If the wastewater contains an excessive amount of solids, it can be clarified by settling, decantation or filtration to reduce the solids content prior to treatment in the primary treatment zone 10. The clarified or unclarified wastewater is introduced via a conduit 14 into the aeration and settling zone 12 wherein it is aerated with a pressurized oxygen containing gas, such as air, in the presence of sufficient amounts of a powdered adsorbent and biologically active solids to reduce the BOD, COD, TOC and adsorbable pollutants to desired levels. The additives present in the aerating and settling zone 12 generally can be the same as described in U.S. Pat. Nos. 3,904,518 and 4,069,148 to Hutton et al., which are incorporated herein by reference.

The adsorbent must be finely divided and readily dispersible in an aqueous medium. Various adsorbents useful in purifying wastewaters can be used. Suitable adsorbents include powdered activated carbon, fuller's earth, diatomaceous earth, fly ash, coke breeze, etc., with powdered activated carbon being preferred. The adsorbent can be added to the aeration and settling zone 12 in any suitable manner, for example, as an aqueous slurry introduced through a conduit 16 or added to the incoming wastewater in the conduit 14.

The amount of adsorbent present in the aeration and settling zone 12 varies, depending primarily on the nature of the wastewater and the degree of treatment desired, i.e., the desired resulting levels of BOD, COD and TOC. Generally, this amount usually is about 50 to about 5,000 milligrams of adsorbent per liter of wastewater. However, some more toxic wastewaters require up to as much as 20,000 milligrams of adsorbent per liter of wastewater and adsorbent concentrations as low as 5 milligrams per liter of wastewater are effective for some less toxic wastewaters.

The biologically active solids present in the aeration and settling zone 12 are suspended solids containing different types of bacteria formed by contacting wastewater, bacteria and oxygen. They can be activated sludge or activated solids found in oxidation ponds and other biological water treatment processes. Generally, the amount of biologically active solids present in the aeration zone provides a total suspended solids concentration (both adsorbent and biologically active solids) of about 10 to about 50,000 parts per million wastewater.

For some wastewaters, particularly some industrial wastewaters, it may be necessary to add biologically active solids to the aeration and settling zone 12 during start up to obtain the desired concentration thereof. The process produces its own biologically active solids which can be recycled to the aeration and settling zone 12 from the contact zone, as described below, to ensure the proper level of bacteria in the aeration zone. Once a suitable concentration of biologically active solids has been reached in the aeration and settling zone 12, that level usually can be maintained without the external addition of the biologically active solids. The above concentration of adsorbent present in the aeration and settling zone 12 includes fresh adsorbent added to the aeration and settling zone via the conduit 14 or the conduit 16, as well as adsorbent recycled to the aeration and settling zone along with biologically active solids.

The adsorbent and biologically active solids (mixed liquor solids) are mixed with the wastewater by a pressurized oxygen-containing gas, such as air, introduced into the aeration and settling zone 12 by an aeration system 18 including a sparger 20 to which the pressurized oxygen-containing gas is supplied via a conduit 22. Other suitable aeration distribution means which causes dissolution of oxygen in the mixture and produces agitation can be used. Also, this aeration may be supplemented by mechanical stirring means.

In the embodiment illustrated in FIG. 1, as a predetermined quantity of wastewater is being introduced into the primary treatment zone 10, it is mixed by aeration in the aeration and settling zone 12 with biologically active solids and powdered adsorbent added via the conduit 16 or to the incoming wastewater flowing through the conduit 14. The amount of wastewater introduced can be controlled by various suitable means such as a liquid level control which is operable to close a flow control valve (not shown) or terminate operation of a pump (not shown) in response to the liquid level in the aeration and settling zone 12 reaching a predetermined upper limit.

After a predetermined reaction time of about 20 minutes to about 24 hours, aeration is terminated to permit a majority of the suspended solids to settle by gravity in the aeration and settling zone 12 and produce a partially-treated wastewater or first clarified aqueous phase and a first settled solid phase. Additional adsorbent can be added to the aeration and settling zone 12 during the reaction period after the predetermined amount of wastewater has been introduced into the primary treatment zone 10.

To accelerate the settling of these solids, a flocculation aid can be added via a conduit 24 to the aeration and settling zone 12. The flocculant aid preferably is added shortly before aeration and agitation are terminated in order to ensure homogeneous mixing with the partially-treated wastewater without causing premature settling of the solids.

While various suitable flocculant aids can be used, cationic polymers, such as Percol 787 or Percol 788 marketed by Allied Colloids, Inc., Suffolk, Virginia, are preferred. These materials are high molecular weight cationic copolymers of a quaternary acrylate salt and acrylamide. The amount of flocculant aid added is sufficient to promote the desired settling of the solids. Generally, this amount is about 0.1 to about 10 mg of flocculant aid per liter of partially-treated wastewater.

The settling period can be varied to meet the requirements of the wastewater being treated. Generally, the settling period is for a time sufficient to permit a majority of the solids to settle and only a relatively small amount of solids (e.g., 5 to 500 milligrams of total suspended solids per liter of the first clarified aqueous phase) remains in the first clarified aqueous phase.

After completion of the settling period, a predetermined amount of the first clarified aqueous phase is withdrawn from the aeration and settling zone 12 via a conduit 26 and transferred to a contact tank 28 for further treatment. This can be controlled by various suitable means such as a liquid level control which is operable to terminate the operation of a pump (not shown) in response to the liquid level in the aeration and settling zone 12 dropping to a predetermined lower limit.

The contact tank 28 includes a mixing and settling zone 29 which is at least partially filled with the partially-treated wastewater withdrawn from the aeration and settling zone 12. As the mixing and settling zone 29 is being filled, fresh powdered adsorbent, which preferably is the same as that used in the aeration and settling zone 12 (e.g., activated carbon), is introduced via a conduit 30 into the mixing and settling zone 29 and inmixed with the incoming partially-treated wastewater by a suitable agitation means. Alternatively, fresh powdered adsorbent can be added to the incoming partially-treated wastewater as it flows through the conduit 26.

While the agitation means can be a mechanical stirring means, in the specific embodiment illustrated, it is an aeration system 32, similar to the one used in the aeration and settling zone 12 and includes a sparger 34 to which a pressurized oxygen-containing gas is supplied through a conduit 36. Agitation by aeration is preferred because oxygen is provided to the bacteria present in the biologically active solids carried over in the partially-treated wastewater from the primary treatment zone 10 and enhances metabolization of pollutants present in the mixing and settling zone 29.

The amount of adsorbent added to the partially-treated wastewater in the mixing and settling zone 29 varies, depending primarily on the degree of treatment desired, i.e., desired maximum levels of BOD, COD and TOC in the effluent. Generally, this amount may be as low as about 10 and as much as about 10,000 milligrams of adsorbent per liter of the incoming partially-treated wastewater. After a predetermined reaction time, which can be as short as about 20 minutes and up to as much as about hours, agitation is terminated to permit the suspended solids to settle by gravity and produce a substantially solids-free second clarified aqueous phase and a second solids phase containing adsorbent and biologically active solids.

To accelerate settling of these solids, a flocculation aid like that used in the aeration and settling zone 12 can be added via a conduit 38 to the mixing and settling zone 29. The flocculant aid preferably is added shortly before agitation is terminated in order to ensure homogeneous mixing with the partially-treated wastewater without causing premature settling of the solids. The amount of flocculant aid added is sufficient to promote the desired settling of the solids, primarily the adsorbent. Generally, this amount is about 0.1 to about 10 milligrams of flocculant aid per liter of partially-treated wastewater.

The settling period can be varied to meet the requirements of the wastewater being treated. For instance, if the suspended solids are difficult to settle, the settling time can be increased as required. After completion of the settling period, a predetermined amount of the second clarified aqueous phase is withdrawn from the contact tank 28 via a conduit 40 for disposal or reuse. These fill, agitation, settling and draw steps are then repeated.

The length of fill time for the contact tank 28 usually is governed by the predetermined amount of the first clarified aqueous phase withdrawn from the aeration and settling zone 12. The contact tank 28 can include control means (not shown) for terminating agitation a predetermined time after the liquid level in the mixing and settling zone 29 has reached a predetermined upper limit, commencing introduction of the flocculant aid a predetermined time after the liquid level reaches the upper limit and before termination of agitation, and terminating withdrawal of the second clarified aqueous phase when the liquid level drops to a predetermined lower limit.

All or a portion of the settled second solids phase (adsorbent and biologically active solids) can be withdrawn from the contact tank 28 via a conduit 42 and pump 44 and recycled via a conduit 46 to the primary treatment zone 10, either by combining with the incoming wastewater (as illustrated) or added directly to the primary treatment zone 10, to maintain the desired concentration of total suspended solids in the aeration and settling zone as mentioned above. If desired, all or a portion of the solids withdrawn from the contact tank 28 can be discharged via a conduit 48 to waste after dewatering or other further treatment. Withdrawal of these solids can be controlled by suitable control means which, after completion of the draw cycle, operates the pump 44 when the solids level in the contact tank 28 reaches a predetermined level.

The retention time of solids in the primary treatment zone 10 can be controlled by withdrawing a portion of the mixed liquor solids with a pump 50 or the like and discharging via a conduit 52 to waste, after dewatering or other further treatment.

While the primary treatment zone 10 and the contact tank 28 are illustrated as separate units, they can share common walls. For example, the contact tank 28 can be a walled off portion of a large aeration basin and include the appropriate controls for liquid and solids flow to provide the desired flow scheme.

Figure 2:
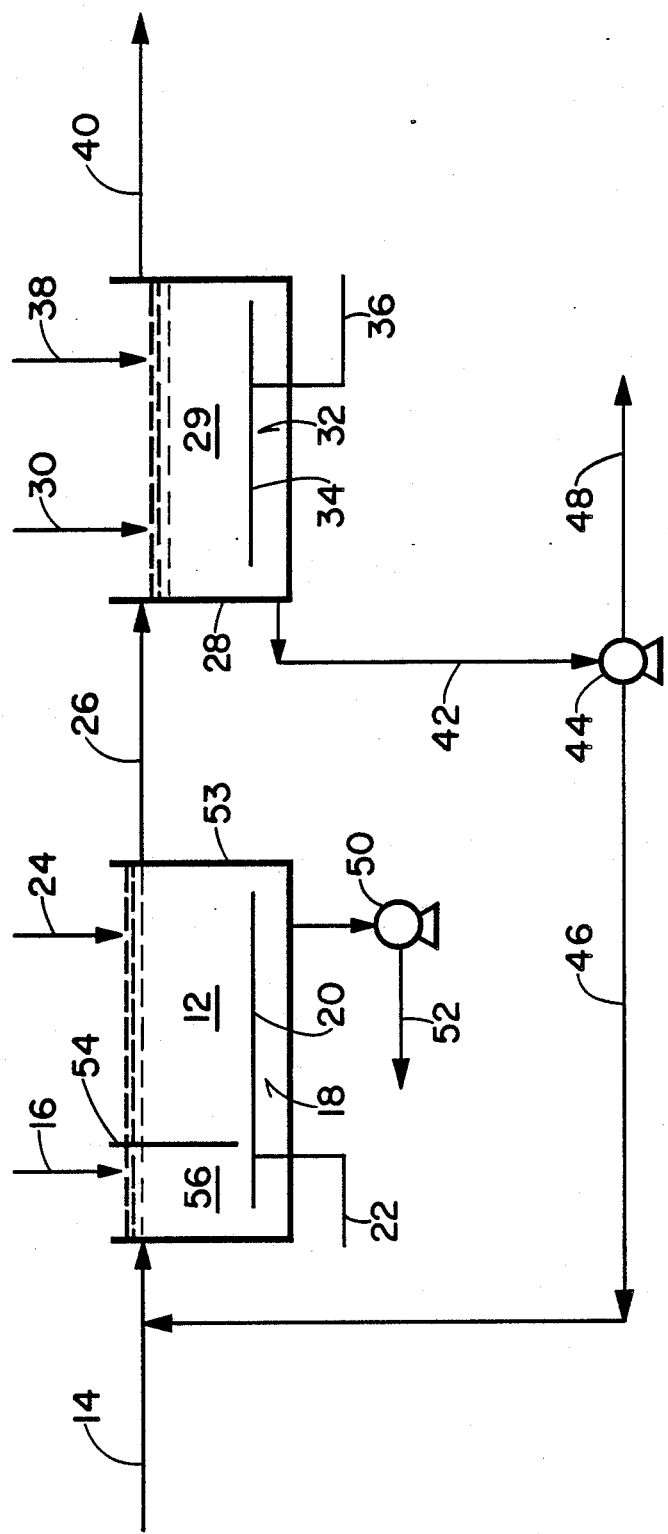
FIG. 2 is a schematic flow diagram of another embodiment of the invention in which wastewater flows continuously into the primary treatment zone.

In the embodiment illustrated in FIG. 2, the contact tank 28 is arranged and operates in the same manner as described above. Accordingly, components common with those illustrated in FIG. 1 are designated with the same reference numerals.

In this embodiment wastewater flows continuously into the primary treatment zone 53; however, the aeration and settling zone 12 is operated in a batchwise manner. The operating conditions for the aeration and settling zone 12 can be substantially the same as those described above. Components of the primary treatment zone 53 common with those illustrated in FIG. 1 are designated with the same reference numerals.

The primary treatment zone 53 includes a downwardly extending baffle 54 defining a turbulent inlet zone 56 which is substantially isolated from and is in continuous fluid communication with the aeration and settling zone 12. The wastewater flowing from the inlet zone 56 into the aeration and settling zone 12 is mixed therein by aeration with biologically active solids and powdered adsorbent which can be added to the aeration and settling zone 12, to the turbent inlet zone 56 via the conduit 16 or to the incoming wastewater flowing through the conduit 14. Aeration is terminated when the liquid level in the aeration and settling zone 12 reaches a first predetermined upper limit. The inflow of wastewater is controlled so there is sufficient time for the desired reaction to occur by the time the liquid level reaches the first predetermined upper limit. A flocculant aid can be added to the aeration and settling zone 12 via the conduit 24 prior to termination of aeration and agitation as described above.

The settling period continues until the liquid level in the aeration and settling zone 12 reaches a predetermined second upper limit, at which time a predetermined amount of the partially-treated wastewater is withdrawn from the aeration and settling zone 12 and transferred to the contact tank 28. A level control means (not shown) or other suitable means can be used for terminating withdrawal of the partially-treated wastewater from the aeration and settling zone 12 when the liquid level therein drops to a predetermined lower limit. After withdrawal of the partially-treated wastewater has been completed, the fill and aeration, settling and draw steps for the primary treatment zone 53 are repeated. During the settling and draw periods, the baffle 54 minimizes disturbance of the solids settling in the aeration and settling zone 12 by the wastewater continuously flowing into the inlet zone 56.

The process of the invention provides a number of advantages. Operating the primary treatment zone to control the concentration of solids in the first aqueous phase or partially-treated wastewater flowing therefrom eliminates the need for downstream clarifier equipment. By so limiting the amount of solids entering the contact zone, it can operate with free settling, rather than hindered settling as is the case when large concentrations of suspended solids are present. Contacting the partially-treated wastewater containing a reduced concentration of suspended solids with a fresh adsorbent in the contact zone improves removal of pollutants. Pollutants which are poorly adsorbed in the aeration and settling zone and carried over into the contact zone are contacted with fresh and more active adsorbent, thereby providing improved removal of these pollutants. The biologically active solids present in the partially-treated wastewater further metabolize pollutants in the contact zone, particularly when aeration with an oxygen-containing gas is used for agitation. The contact or agitation period and the settling period in the contact zone can be conveniently adjusted to meet the requirements for the particular wastewater being treated. While wastewater can be continuously introduced into the primary treatment zone the overall process can be operated as a two-stage batch process.

From the foregoing description, one skilled in the art can easily ascertain the essential characteristics of the invention and, without departing from the spirit and scope thereof, make various changes and modifications to adapt it to various usages.

We claim:

1. A process for purifying wastewater containing organic and adsorbable pollutants comprising the steps of:
   (a) introducing a predetermined quantity of the wastewater into a primary treatment zone including an aeration and settling zone;
   (b) aerating the wastewater in said aeration and settling zone with an oxygen-containing gas in the presence of sufficient amounts of a powdered adsorbent and biologically active solids to reduce the BOD, COD and TOC to desired levels;
   (c) terminating aeration and retaining said thus-treated wastewater in said aerating and settling zone a sufficient time for solids therein to settle by gravity and produce a first solids phase and a first aqueous phase containing a maximum predetermined amount of said solids;
   (d) withdrawing a predetermined amount of said first aqueous phase from said aeration and settling zone and transferring same into a contact zone;
   (e) agitating said first aqueous phase in said-contact zone in the presence of a powdered adsorbent for an agitation period sufficient to reduce the BOD, COD and TOC to desired levels;
   (f) terminating agitation and allowing solids in said thus-treated first aqueous phase to settle by gravity for a settling period sufficient to produce a clarified, substantially solids-free, second aqueous phase and a second solids phase; and
   (g) thereafter withdrawing a predetermined amount of said second aqueous phase from said contact zone.

2. A process according to claim 1 wherein the total amount of adsorbent and biologically active solids present in said aeration and settling zone is about 10 to about 50,000 parts per million parts of the wastewater.

3. A process according to claim 2 wherein the amount of said adsorbent present in the aeration and settling zone is about 5 to about 20,000 parts per million of the wastewater.

4. A process according to claim 3 wherein said adsorbent is activated carbon.

5. A process according to claim 1 including the step of adding to said aeration and settling zone a flocculant aid for promoting settling of solids therein prior to terminating aeration.

6. A process according to claim 5 wherein said flocculant aid is a cationic polymer.

7. A process according to claim 1 wherein
said primary treatment zone includes an inlet zone which is substantially isolated from and is in continuous fluid communication with said aeration and settling zone;
in step (a) the wastewater continuously flows into said inlet zone at a first flow rate and passes therefrom into said agitation and settling zone; and
in step (d) said first aqueous phase is withdrawn from said aeration and settling zone at a second flow rate greater than said first flow rate until said predetermined amount of said first aqueous phase has been withdrawn.

8. A process according to claim 7 wherein step (c) is commenced when the liquid level in said aeration and settling zone reaches a predetermined upper limit.

9. A process according to claim 8 wherein step (d) is continued until the liquid level of said first aqueous phase drops to a predetermined lower limit.

10. A process according to claim 1 wherein said agitation in said contact zone is carried out by introducing a pressurized oxygen-containing gas thereinto.

11. A process according to claim 1 wherein said agitation in said contact zone is carried out by mechanical agitation means.

12. A process according to claim 1 including the step of adding to said contact zone a
flocculation aid for promoting settling of said adsorbent to said first aqueous phase near the end of said agitation period.

13. A process according to claim 12 wherein said flocculation aid is a cationic polymer.

14. A process according to claim 1 including the step of recycling at least a portion of said second solids phase from said contact zone to said primary treatment zone.

15. A process according to claim 14 including the step of withdrawing a portion of the mixed liquor solids phase from said primary treatment zone so as to maintain the amounts of said adsorbent and biologically active solids present in said aeration and settling zone at a predetermined level.

* * * * *